(12) United States Patent
Bielefeld et al.

(10) Patent No.: US 11,459,076 B1
(45) Date of Patent: Oct. 4, 2022

(54) SYSTEMS AND METHODS FOR CONTROLLING TRANSMISSION VALVES IN A MARINE PROPULSION DEVICE

(71) Applicant: Brunswick Corporation, Mettawa, IL (US)

(72) Inventors: Brett Bielefeld, Fond du Lac, WI (US); Charles A. Lubitz, Fond du Lac, WI (US); Matthew W. Snyder, Fond du Lac, WI (US)

(73) Assignee: Brunswick Corporation, Mettawa, IL (US)

(*) Notice: Subject to any disclaimer, the term of this patent is extended or adjusted under 35 U.S.C. 154(b) by 495 days.

(21) Appl. No.: 16/734,008

(22) Filed: Jan. 3, 2020

(51) Int. Cl.
*B63H 23/30* (2006.01)
*B63H 21/21* (2006.01)
*F16H 61/02* (2006.01)
*B63H 23/02* (2006.01)
*F16K 31/02* (2006.01)
*B63H 23/26* (2006.01)
*F16K 29/00* (2006.01)

(52) U.S. Cl.
CPC .............. *B63H 21/21* (2013.01); *B63H 23/02* (2013.01); *B63H 23/26* (2013.01); *B63H 23/30* (2013.01); *F16H 61/0204* (2013.01); *F16H 61/0251* (2013.01); *F16K 29/00* (2013.01); *F16K 31/02* (2013.01); *B63H 2021/216* (2013.01); *F16H 2708/22* (2013.01)

(58) Field of Classification Search
CPC ...... B63H 23/30; B63H 21/21; B63H 21/213; B63H 2021/216; B63H 23/02; F16K 29/00; F16K 31/02; F16H 2708/22
See application file for complete search history.

(56) References Cited

U.S. PATENT DOCUMENTS

| 6,176,750 | B1 | 1/2001 | Alexander et al. | |
|---|---|---|---|---|
| 8,439,800 | B1 | 5/2013 | Bazan et al. | |
| 9,441,724 | B1 | 9/2016 | Pugh | |
| 2004/0025941 | A1* | 2/2004 | Wuerth | F16K 31/02 137/487.5 |
| 2005/0245353 | A1* | 11/2005 | Scelers | F16H 61/12 477/127 |

(Continued)

FOREIGN PATENT DOCUMENTS

GB          1530959 A          11/1978

*Primary Examiner* — Andrew Polay

(74) *Attorney, Agent, or Firm* — Andrus Intellectual Property Law, LLP

(57) ABSTRACT

A method for controlling a valve to disengage a gear in a transmission. The method includes reducing, after receiving a request to disengage the gear, a current supplied to the valve from a starting to a first current. The method further includes counting a first elapsed time since the valve was reduced to the first current, comparing the first elapsed time to a first wait time, and increasing the current supplied to the valve to a second current once the first elapsed time exceeds the first wait time. The method further includes counting a second elapsed time since the valve was increased to the second current, comparing the second elapsed time to a second wait time, and reducing the current supplied to the valve to a third current once the second elapsed exceeds the second wait time. The valve is closed when the current is the third current.

20 Claims, 9 Drawing Sheets

(56) References Cited

U.S. PATENT DOCUMENTS

| | | | | |
|---|---|---|---|---|
| 2010/0101653 A1* | 4/2010 | Ogata | ................... | F16H 61/12 137/455 |
| 2011/0246035 A1* | 10/2011 | Tarantini | ............ | F16H 61/0251 701/58 |
| 2020/0147632 A1* | 5/2020 | Wang | ................. | F16K 37/0041 |

* cited by examiner

SYSTEMS AND METHODS FOR CONTROLLING TRANSMISSION VALVES IN A MARINE PROPULSION DEVICE

FIELD

The present disclosure relates to systems and methods for controlling transmission valves in a marine propulsion device, and particularly to de-energizing valves to disengage gears.

BACKGROUND

GB Patent Application Publication No. 1530959A discloses an automatic change-gear assembly for a water-jet boat propulsion system having an input shaft linked to an output shaft via a one-way clutch and an overdrive system comprising gears meshing with gears on the input and output shafts respectively, the gears being drivingly interconnectible by a fluid actuated multiplate clutch. Clutch is engaged when fluid pressure in a throttled passageway in a layshaft carrying the gears builds up to displace annular piston with gear. Fluid pressure is supplied by a pump when a lubricating by-pass valve is closed by a solenoid. Valve is normally closed at low speeds, and thus drive is effected through the overdrive, the gear change to direct drive taking place in response to one of the following; maximum engine throttle-opening, predetermined engine speed, predetermined boat speed or a manual override, or dis-engagement of the direct-drive by a neutral switch. In a modification there are two overdrives, having different drive ratios, and operative sequentially.

U.S. Pat. No. 6,176,750 discloses an improved hydraulic system for a twin propeller marine propulsion unit. A vertical drive shaft is operably connected to the engine of the propulsion unit and carries a pinion that drives a pair of coaxial bevel gears. An inner propeller shaft and an outer propeller shaft are mounted concentrically in the lower torpedo section of the gear case and each propeller shaft carries a propeller. To provide forward movement for the watercraft, a sliding clutch is moved in one direction to operably connect the first of the bevel gears with the inner propeller shaft to drive the rear propeller. A hydraulically operated multi-disc clutch is actuated when engine speed reaches a pre-selected elevated value to operably connect the second of the bevel gears to the outer propeller shaft, to thereby drive the second propeller in the opposite direction. The hydraulic system for actuating the multi-disc clutch includes a pump connected to the inner propeller shaft, and the pump has an inlet communicating with a fluid reservoir in the gear case and has an outlet which is connected through a hydraulic line to the multi-disc clutch. A strainer, a pressure regulator and a valve mechanism are disposed in the lower gear case and are located in series in the hydraulic line. At idle and slow operating speeds the valve is held by a solenoid in a position where the fluid is dumped to the reservoir, so that the pressure of the fluid being directed to the multi-disc clutch is insufficient to engage the clutch. At engine speeds above a preselected value, the solenoid is de-energized and the valve is then biased to a position where the fluid is delivered to the multi-disc clutch to engage the clutch and cause operation of the second propeller.

U.S. Pat. No. 8,439,800 discloses a shift control system for a marine drive that applies partial clutch engagement pressure upon initial shifting from forward to reverse to prevent stalling of the engine otherwise caused by applying full clutch engagement pressure upon shifting from forward to reverse.

U.S. Pat. No. 9,441,724 discloses a method of monitoring and controlling a transmission in a marine propulsion device comprising the steps of receiving a rotational input speed of an input shaft to the transmission, receiving a rotational output speed of an output shaft from the transmission, receiving a shift actuator position value, and receiving an engine torque value. The method further comprises calculating a speed differential based on the input speed and the output speed, and generating a slip profile based on a range of speed differentials, engine torque values, and shift actuator position values.

The above-noted patents and applications are hereby incorporated by reference herein, in their entireties.

SUMMARY

This Summary is provided to introduce a selection of concepts that are further described herein below in the Detailed Description. This Summary is not intended to identify key or essential features of the claimed subject matter, nor is it intended to be used as an aid in limiting the scope of the claimed subject matter.

One embodiment according to the present disclosure generally relates to a method for controlling a valve to disengage a gear in a transmission for a marine propulsion device. The method includes reducing, after receiving a request to disengage the gear, a current supplied to the valve from a starting current to a first current. The method further includes counting a first elapsed time since the valve was reduced to the first current, comparing the first elapsed time to a first wait time greater than zero seconds, and increasing the current supplied to the valve to a second current once the first elapsed time is determined to exceed the first wait time. The method further includes counting a second elapsed time since the valve was increased to the second current, comparing the second elapsed time to a second wait time greater than zero seconds, and reducing the current supplied to the valve to a third current once the second elapsed time is determined to exceed the second wait time. The valve is closed when the current supplied to the valve is the third current.

Another embodiment according to the present disclosure generally relates to a transmission for a marine propulsion device. The transmission includes a valve and a gear that is selectively engageable by the valve to generate propulsion for the marine propulsion device, where the engagement of the gear is controlled by controlling a current supplied to the valve. A memory module stores first, second, and third second currents for supplying current to the valve, and first and second wait times for controlling the current supplied to the valve, where the first and second wait times are non-zero. A processing module is operatively coupled to the memory module and the valve and is configured to receive a request to disengage the gear and to subsequently reduce the current supplied to the valve from a starting current to the first current, count a first elapsed time since the valve was reduced to the first current, and compare the first elapsed time to the first wait time and to increase the current supplied to the valve to the second current once the first elapsed time exceeds the first wait time. The processing module is further configured to count a second elapsed time since the valve was increased to the second current, compare the second elapsed time to the second wait time, and to reduce the current supplied to the valve to the third current once the second elapsed time exceeds the second wait time. The valve is closed when the current supplied to the valve is the third current.

Another embodiment according to the present disclosure generally relates to a method for controlling a valve to disengage a gear in a transmission for a marine propulsion device. The method includes reducing, after receiving a request to disengage the gear, a current supplied to the valve from a starting current to a first current, where the first current is less than 50% of the starting current and also greater than zero. The method further includes counting a first elapsed time since the valve was reduced to the first current, comparing the first elapsed time to a first wait time that is between 5 and 900 ms, and increasing the current supplied to the valve to a second current once the first elapsed time is determined to exceed the first wait time. The method further includes counting a second elapsed time since the valve was increased to the second current, comparing the second elapsed time to a second wait time greater than zero seconds, and reducing the current supplied to the valve to a third current once the second elapsed time is determined to exceed the second wait time. The valve is closed when the current supplied to the valve is the third current.

BRIEF DESCRIPTION OF THE DRAWINGS

The present disclosure is described with reference to the following Figures. The same numbers are used throughout the Figures to reference like features and like components.

DETAILED DESCRIPTION

In the present description, certain terms have been used for brevity, clarity, and understanding. No unnecessary limitations are to be implied therefrom beyond the requirement of the prior art because such terms are used for descriptive purposes only and are intended to be broadly construed. The different systems and methods described herein may be used alone or in combination with other systems and methods. Various equivalents, alternatives, and modifications are possible.

Figure 1:
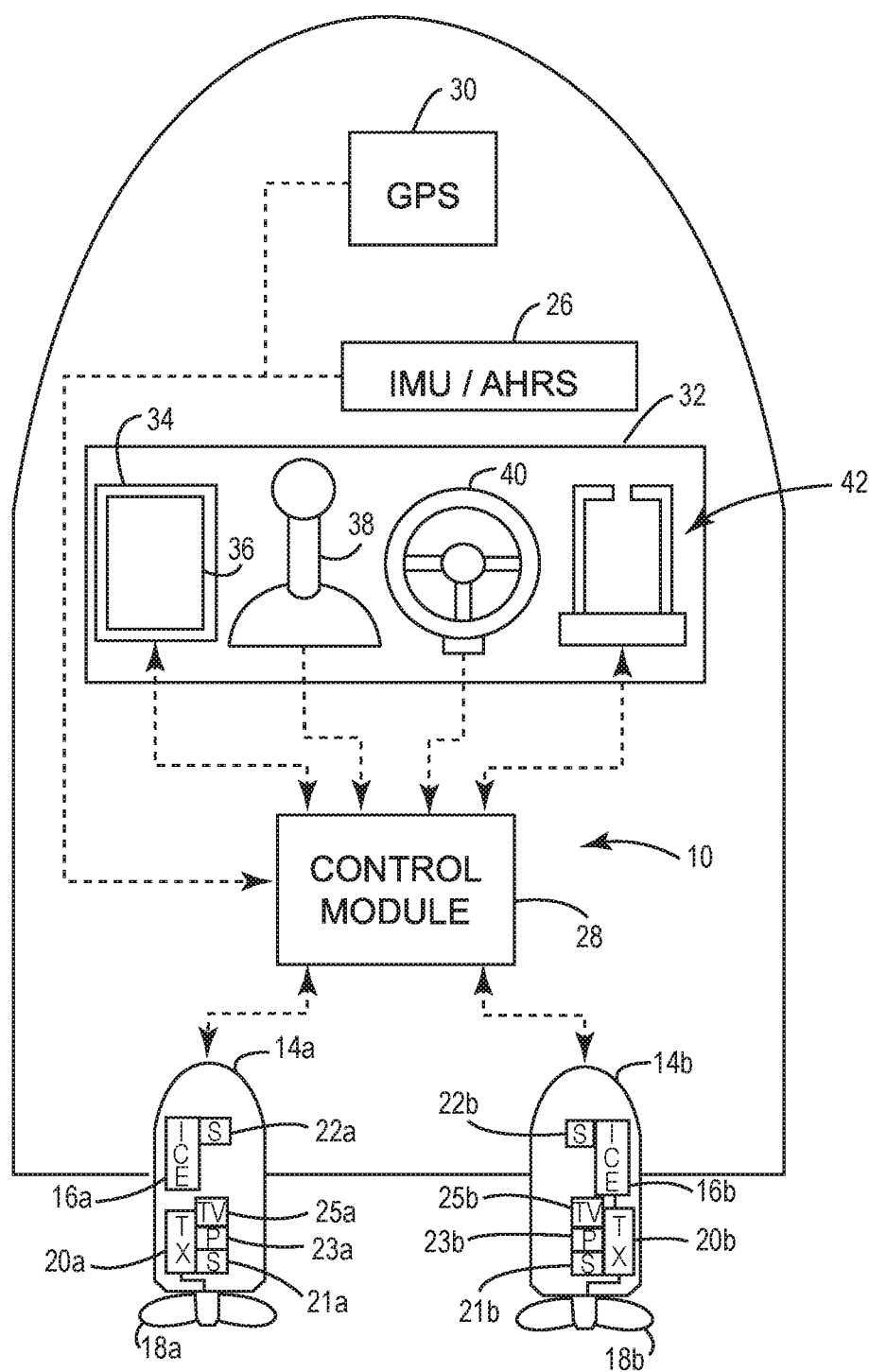
FIG. 1 illustrates one example of a marine vessel including a marine propulsion system according to the present disclosure.

FIG. 1 illustrates a marine propulsion system 10 for a marine vessel 12. The marine propulsion system 10 includes two marine propulsion devices 14a, 14b, but one or more than two marine propulsion devices could instead be provided. The marine propulsion devices 14a, 14b shown herein are outboard motors, but the marine propulsion devices could instead be inboard motors, stern drives, pod drives, jet drives, etc. Each marine propulsion device 14a, 14b includes an engine 16a or 16b. The engines 16a, 16b shown here are internal combustion engines, which may be, for example, gasoline or diesel engines. Each marine propulsion device 14a, 14b also includes a propeller 18a or 18b configured to be coupled in torque-transmitting relationship with a respective engine 16a or 16b. Such torque-transmitting relationship is more specifically provided by way of a transmission 20a or 20b configured to transmit torque from a respective engine 16a or 16b to a respective propeller 18a or 18b. As will described further herein below with respect to FIG. 2, each transmission 20a, 20b is configured to transmit torque from the engine 16a or 16b to the propeller 18a or 18b at one of at least a first gear ratio and a second gear ratio, although additional gear ratios such as, for example, third, fourth, fifth, etc. gear ratios could be provided. Alternatively, only a single forward gear ratio may be provided.

The marine propulsion system 10 further includes engine speed sensors 22a, 22b measuring a speed of a respective engine 16a, 16b. In one example, the engine speed sensors 22a, 22b may be shaft rotational speed sensors (e.g., tachometers), which measure a speed of the engine 16a or 16b in rotations per minute (RPM), as is known to those having ordinary skill in the art. Each transmission 20a, 20b includes a transmission output speed (TOS) sensor 21a, 21b that measures an output speed of the respective transmission 20a, 20b in RPM. The TOS sensors 21a, 21b may be of a type similar to that of the engine speed sensors 22a, 22b. Clutch pressure sensors 23a, 23b are also provided in connection with the transmissions 20a, 20b. Clutch pressure sensors 23a, 23b can be pressure transducers in the hydraulic circuit(s) associated with the clutches of the transmissions 20a, 20b. Trolling valves 25a, 25b are also provided for each marine propulsion device 14a, 14b, and will be described further herein below.

The marine propulsion system 10 also includes a control module 28 in signal communication with the engines 16a, 16b and the transmissions 20a, 20b, as well as their associated sensors and valves and other components noted herein below. The control module 28 is programmable and includes a processor and a memory. The control module 28 can be located anywhere in the marine propulsion system 10 and/or located remote from the marine propulsion system 10 and can communicate with various components of the marine vessel 12 via a peripheral interface and wired and/or wireless links, as will be explained further herein below. Although FIG. 1 shows one control module 28, the marine propulsion system 10 can include more than one control module. Portions of the method disclosed herein below can be carried out by a single control module or by several separate control modules. For example, the marine propulsion system 10 can have control modules located at or near a helm 32 of the marine vessel 12 and can also have control module(s) located at or near the marine propulsion devices 14a, 14b. If more than one control module is provided, each can control operation of a specific device or sub-system on the marine vessel.

In some examples, the control module 28 may include a computing system that includes a processing system, storage system, software, and input/output (I/O) interfaces for communicating with peripheral devices. The systems may be implemented in hardware and/or software that carries out a programmed set of instructions. As used herein, the term "control module" may refer to, be part of, or include an application specific integrated circuit (ASIC); an electronic circuit; a combinational logic circuit; a field programmable gate array (FPGA); a processor (shared, dedicated, or group) that executes code; other suitable components that provide the described functionality; or a combination of some or all of the above, such as in a system-on-chip (SoC). A control module may include memory (shared, dedicated, or group) that stores code executed by the processing system. The term "code" may include software, firmware, and/or microcode, and may refer to programs, routines, functions, classes, and/or objects. The term "shared" means that some or all code from multiple control modules may be executed using a single (shared) processor. In addition, some or all code from multiple control modules may be stored by a single (shared) memory. The term "group" means that some or all code from a single control module may be executed using a group of processors. In addition, some or all code from a single control module may be stored using a group of memories.

The control module 28 communicates with one or more components of the marine propulsion system 10 via the I/O interfaces and a communication link, which can be a wired or wireless link. In one example, the communication link is a controller area network (CAN) bus, but other types of links could be used. It should be noted that the extent of connections of the communication link shown herein is for schematic purposes only, and the communication link in fact provides communication between the control module 28 and each of the peripheral devices noted herein, although not every connection is shown in the drawing for purposes of clarity.

Figure 3:
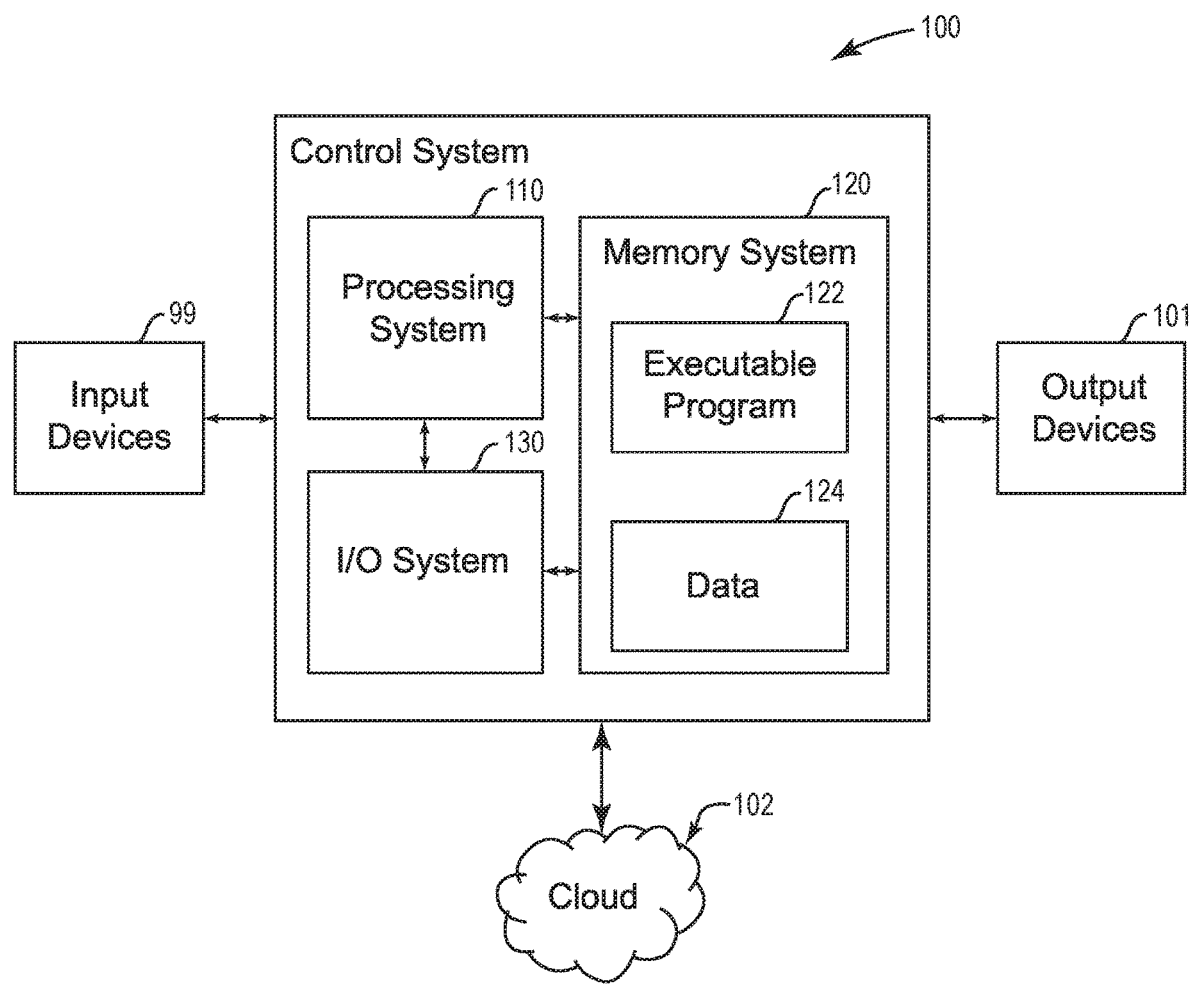
FIG. 3 is a schematic view of an exemplary control system for controlling transmission valves according to the present disclosure.

An exemplary control system 100 is shown in FIG. 3, which can be used as the control module 28 discussed above. Certain aspects of the present disclosure are described or depicted as functional and/or logical block components or processing steps, which may be performed by any number of hardware, software, and/or firmware components configured to perform the specified functions. For example, certain embodiments employ integrated circuit components, such as memory elements, digital signal processing elements, logic elements, look-up tables, or the like, configured to carry out a variety of functions under the control of one or more processors or other control devices. The connections between functional and logical block components are merely exemplary, which may be direct or indirect, and may follow alternate pathways.

In certain examples, the control system 100 communicates with each of the one or more components of the marine propulsion system 10 via a communication link CL, which can be any wired or wireless link. The control module 100 is capable of receiving information and/or controlling one or more operational characteristics of the marine propulsion system 10 and its various sub-systems by sending and receiving control signals via the communication links CL. In one example, the communication link CL is a controller area network (CAN) bus; however, other types of links could be used. It will be recognized that the extent of connections and the communication links CL may in fact be one or more shared connections, or links, among some or all of the components in the system 1. Moreover, the communication link CL lines are meant only to demonstrate that the various control elements are capable of communicating with one another, and do not represent actual wiring connections between the various elements, nor do they represent the only paths of communication between the elements. Additionally, the marine propulsion system 10 may incorporate various types of communication devices and systems, and thus the illustrated communication links CL may in fact represent various different types of wireless and/or wired data communication systems.

The control system 100 may be a computing system that includes a processing system 110, memory system 120, and input/output (I/O) system 130 for communicating with other devices, such as input devices 99 and output devices 101, either of which may also or alternatively be stored in a cloud 102. The processing system 110 loads and executes an executable program 122 from the memory system 120, accesses data 124 stored within the memory system 120, and directs the marine propulsion system 10 to operate as described in further detail below.

The processing system 110 may be implemented as a single microprocessor or other circuitry, or be distributed across multiple processing devices or sub-systems that cooperate to execute the executable program 122 from the memory system 120. Non-limiting examples of the processing system include general purpose central processing units, application specific processors, and logic devices.

The memory system 120 may comprise any storage media readable by the processing system 110 and capable of storing the executable program 122 and/or data 124. The memory system 120 may be implemented as a single storage device, or be distributed across multiple storage devices or sub-systems that cooperate to store computer readable instructions, data structures, program modules, or other data. The memory system 120 may include volatile and/or non-volatile systems, and may include removable and/or non-removable media implemented in any method or technology for storage of information. The storage media may include non-transitory and/or transitory storage media, including random access memory, read only memory, magnetic discs, optical discs, flash memory, virtual memory, and non-virtual memory, magnetic storage devices, or any other medium which can be used to store information and be accessed by an instruction execution system, for example.

Returning to FIG. 1, the marine propulsion system 10 also includes a global positioning system (GPS) 30 that provides location and speed of the marine vessel 12 to the control module 28. Additionally or alternatively, a vessel speed sensor such as a Pitot tube or a paddle wheel could be provided. The marine propulsion system 10 may also include an inertial measurement unit (IMU) or an attitude and heading reference system (AHRS) 26. An IMU has a solid state, rate gyro electronic compass that indicates the vessel heading and solid state accelerometers and angular rate sensors that sense the vessel's attitude and rate of turn. An AHRS provides 3D orientation of the marine vessel 12 by integrating gyroscopic measurements, accelerometer data, and magnetometer data. The IMU/AHRS could be GPS-enabled, in which case a separate GPS 30 would not be required.

Further, the marine propulsion system 10 includes a number of operator input devices located at the helm 32 of the marine vessel 12. The operator input devices include a multi-functional display device 34 including a user interface 36. The user interface 36 may be an interactive, touch-capable display screen, a keypad, a display screen and keypad combination, a track ball and display screen combination, or any other type of user interface known to those having ordinary skill in the art for communicating with a multi-functional display device 34. A joystick 38 is also provided at the helm 32 and allows an operator of the marine vessel 12 to command the marine vessel 12 to translate or rotate in any number of directions. A steering wheel 40 is provided for providing steering commands to the marine propulsion devices 14a, 14b or to a rudder, in the event that the marine propulsion devices are not steerable. A throttle lever 42 is also provided for providing thrust commands, including both a magnitude and a direction of thrust, to the control module 28. Here, two throttle levers are shown, each of which can be used to control one of the marine propulsion devices 14a or 14b, although the two levers can be controlled together as a single lever. Alternatively, a single lever could be provided for controlling both marine propulsion devices 14a, 14b.

Several of the operator input devices at the helm 32 can be used to input an operator demand on the engines 16a, 16b to the control module 28, including the user interface 36 of the multi-functional display device 34, the joystick 38, and the throttle lever 42. By way of example, a rotation of the throttle lever 42 in a forward direction away from its neutral, detent position could be interpreted as a value from 0% to 100% operator demand corresponding via an input/output map, such as a look up table, to a position of the throttle valves of the engines 16a, 16b. For example, the input/output map might dictate that the throttle valves are fully closed when the throttle lever 42 is in the forward, detent position (i.e., 0% demand), and are fully open when the throttle lever 42 is pushed forward to its furthest extent (i.e., 100% demand).

Figure 2:
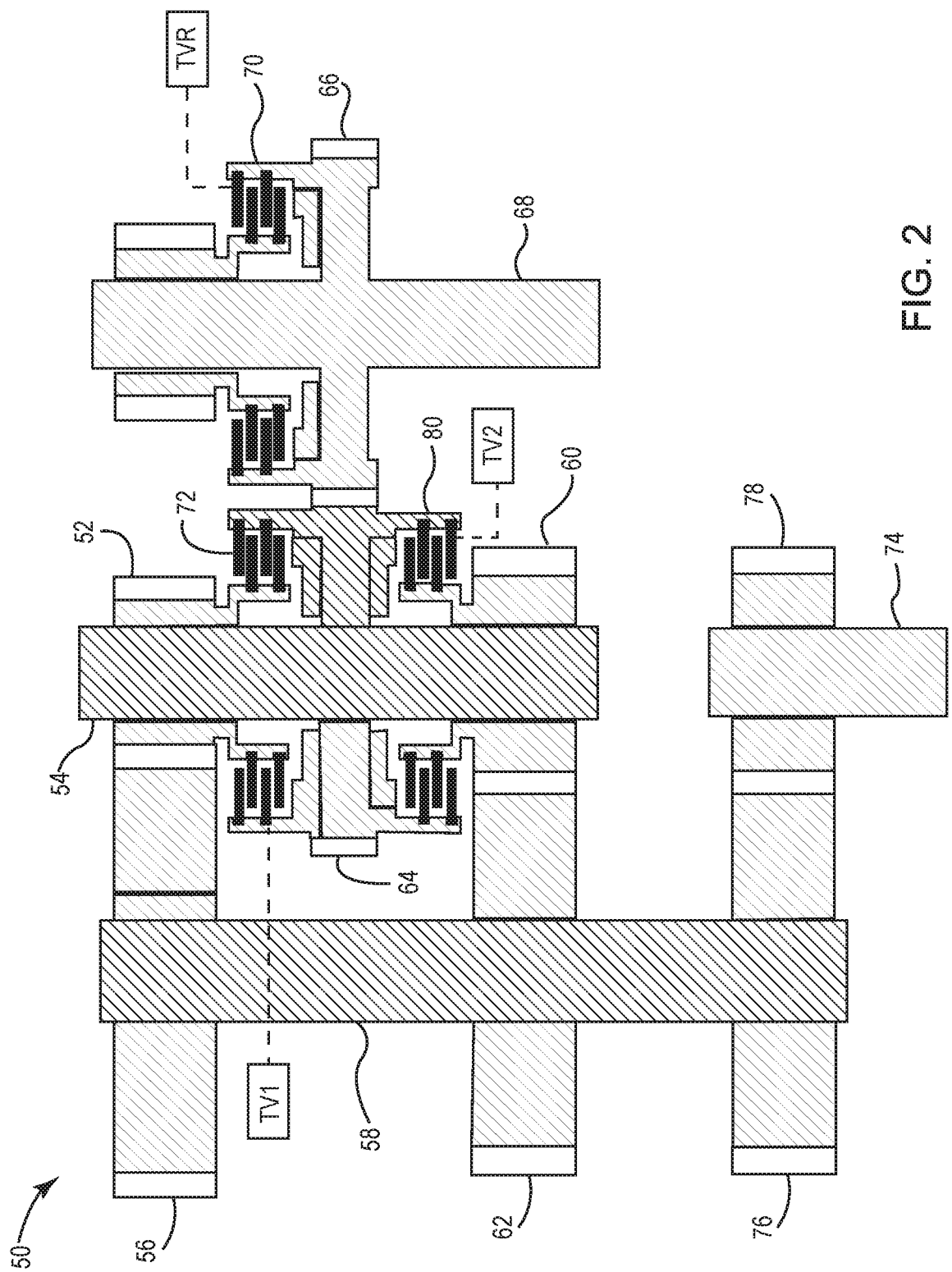
FIG. 2 is a schematic illustrating one example of a transmission for an engine powering a marine propulsion device according to the present disclosure.

One schematic example of a multi-speed transmission 50 (i.e., transmission 20a or 20b) is shown in FIG. 2. The transmission 50 shown herein is a two-speed layshaft transmission, but other transmissions, such as epicyclic (planetary), dual-clutch, continuously variable, or of other known type could be used. The transmission 50 shown herein has two gear ratios, provided by a first input gear 52 on input shaft 54 (which is coupled to an output shaft of the engine 16a or 16b, as is known) and a first counter gear 56 on countershaft 58, and by a second input gear 60 and a second counter gear 62. Alternatively, fewer or more than two forward gear ratios could be provided. A reverse gear 64 is also provided on input shaft 54, and meshes with reverse gear 66 on reverse shaft 68, but will not be described further herein, other than to say reverse rotation of the propeller 18a or 18b is accomplished by way of actuating reverse clutch 70.

A first-gear clutch 72 is provided for placing the transmission 50 in first gear, such that first input gear 52 and first counter gear 56 transmit torque to output shaft 74 via output counter gear 76 and output gear 78 at a first gear ratio. A second-gear clutch 80 is provided for placing the transmission 50 in second gear, such that second input gear 60 and second counter gear 62 transmit torque to output shaft 74 via output counter gear 76 and output gear 78 at a second gear ratio. In one example, the first gear ratio is higher than the second gear ratio. Thus, when the transmission 50 transmits torque from the engine 16a or 16b, via the input shaft 54, the first gears 52, 56, the output gears 76, 78, and the output shaft 74 to the propeller 18a or 18b (via a propeller shaft) the transmission 50 provides more torque and less speed than it would provide were it to be placed in second gear, engine input speed being equal. Simplicity, engagement within any of the gears will also be referred to herein as being "in gear". Note that the clutches 70, 72, 80 shown herein are multi-plate wet disc clutches, and each is provided with a trolling valve TV1, TV2, TVR (i.e., trolling valve 25a, 25b).

In inboard motors, for example, it is known to couple a trolling valve to a forward clutch and a reverse clutch in a marine engine's transmission. The forward and reverse clutches engage forward and reverse gears, respectively, via pressure plates of a wet clutch. One example of such a system is described in U.S. Pat. No. 8,439,800, which was incorporated by reference herein above. The amount of engagement of the clutches with the gears can optionally be controlled by the trolling valves, where engagement can range from not engaged (100% slip) to fully engaged (0% slip). Control over slip results in control over the resulting speed of the propeller on the marine propulsion device, as more or less rotational power from the output shaft of the engine is transmitted to the forward or reverse gear, which in turn provides more or less torque to the propeller shaft. Therefore, a higher percentage of slip leads to lower propeller speeds (and thus lower boat speeds), and a lower percentage of slip leads to higher propeller speeds (and thus higher boat speeds).

The trolling valves TV1, TV2, TVR may be configured to receive control signals from the control module 28 and responsively control an amount of hydraulic fluid to the clutches 70, 72, 80, thus controlling the amount of engagement of the clutches 70, 72, 80 with their respective gears 66, 52, 60. Although the valves are referred to as "trolling" valves, thus implying a specific application on marine vessels for trolling operations, the valves TV1, TV2, TVR may be used in any of a variety of other applications for the purpose of controlling an amount of hydraulic fluid to the clutches 70, 72, 80. For example, as will be discussed herein below, the trolling valves TV1, TV2, TVR can be used in order to carry out a method for enhancing launch of the marine vessel 12.

Through experimentation and development, the inventors have identified that the valves presently known in the art for controlling the engagement of gears within a transmission are difficult to control. In particular, a residual pressure remains within the valve even when the current to the driving solenoid is off, which is sometimes referred to as the valve being "sticky." One known cause for a valve becoming "sticky" is the residual buildup of sediment within the valve overtime, due to the breakdown of lubricating fluid, contamination, and wear and tear of the valve itself, for example. Consequently, a sticky valve is slow (or unable) to respond to user requests to change gears, resulting in inferior performance. One such exemplary valve is a DRE05SK proportional pressure reducing valve by Bosch Rexroth AG.

The inventors have further identified that the problem of sticky valves is worsened within the context of marine propulsion devices, and are worse yet for those in which trolling occurs. Through research and development, the inventors have identified that the stickiness of a valve increases the longer that the valve is operated maintained in a static position, and particularly one in which the clutch operated by that valve is permitted to slip (the mechanism that allows trolling in the first place). Extending the time that the clutch is slipping increases heat, and therefore increases the stickiness of the valve as well. The valve gets sticky while trolling because it is held in one static position, and specifically one in which it is only slightly open (e.g., providing 5-10% of full pressure). When the system tries to close the valve from a partially opened position to disengage the clutch, such as after trolling, the inventors have identified a tendency to stick in a partially cracked open state with residual pressure.

In practice, the inventors have identified that the stickiness is most noticeable during small commands for trolling within a closed loop pressure control for controlling the valve. When the user is done trolling and wants to return to neutral (in other words, to disengage the gear engaged for trolling), the valve does not fully close due to the stickiness discussed above. This results in pressure remaining within the clutch and hydraulic passages, thereby preventing or delaying the time until the transmission fully shifts to neutral. Within the context of allowing the clutch to slip in a trolling operation mode, returning to neutral refers to the clutch slip percentage returning to 100%, meaning no engagement between gears is provided by the clutch. As such, if a sticky valve does not fully disengage, the marine propulsion device is therefore stuck in gear, leading the dangerous and damaging situations for the marine vessel.

In certain examples, inventors have identified that the residual pressure within the valve may not be enough to cause the clutch piston to touch the plates. However, there is still a risk that additional centrifugal forces at high operating speeds may nonetheless cause the clutch to touch the plates, thereby over heating the clutch and causing the plates to warp.

Figure 4:
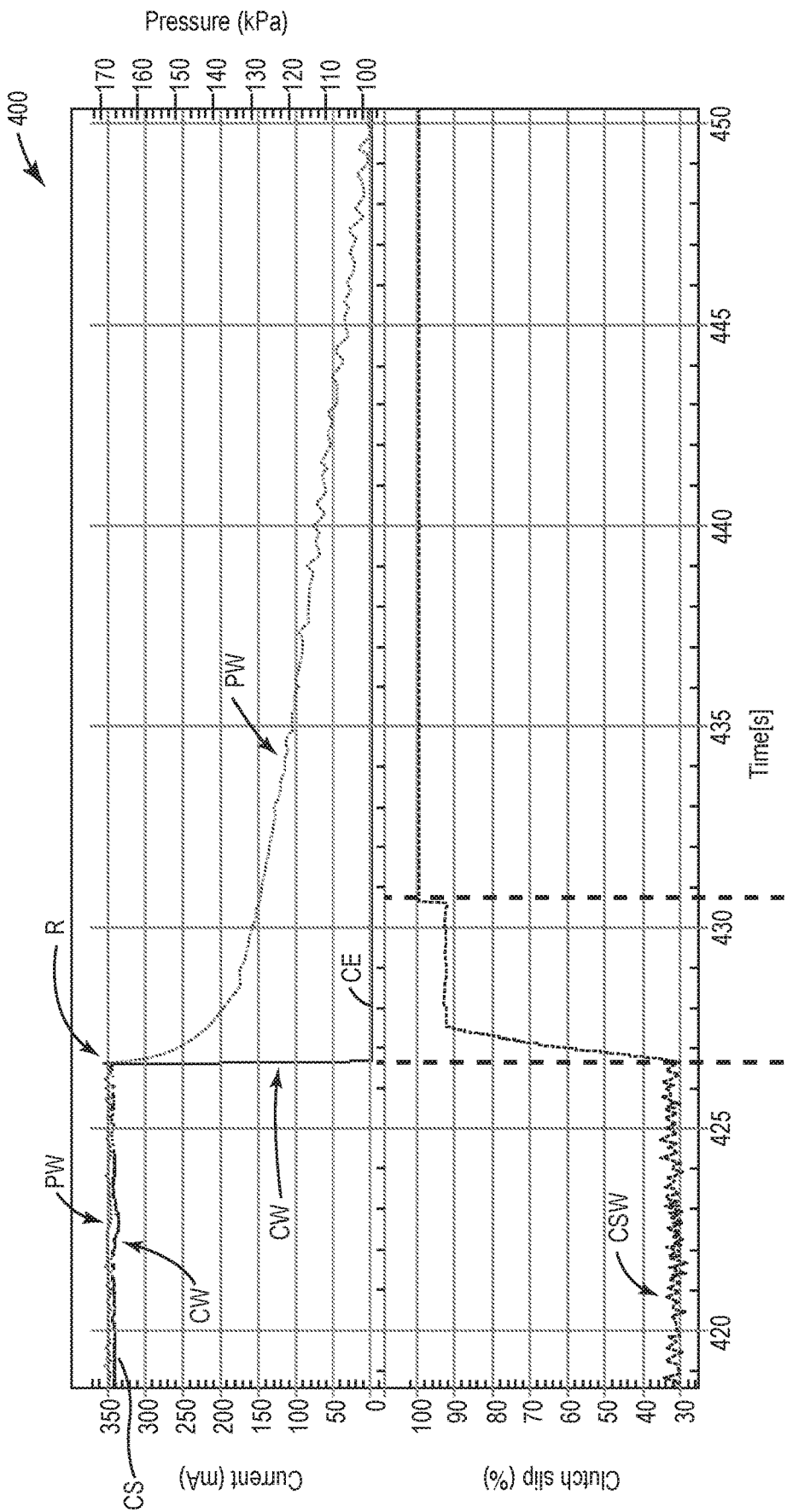
FIG. 4 is graph depicting the control and consequent performance of a valve and transmission controlled in the manner presently known in the art.

FIG. 4 is a graph depicting data for an exemplary valve and clutch in operation in the manner presently known in the art. The graph 400 includes a current waveform CW depicting the electrical current supplied to the valve as a function of time, which is the present case is shown at a starting current CS, and reduces to an ending current CE upon receiving a request R from a user to disengage a gear driven by that valve. The graph 400 further includes a pressure waveform PW showing the pressure within the valve over time, as well as a clutch slip waveform CSW depicting the slip percentage of the clutch has result of the pressure in the valve. As can be seen in FIG. 4, the pressure waveform PW for the valve does not immediately decline to its lowest level, but transitions relatively slowly overtime. Although the current waveform CW drops to its ending current CE almost instantly after the user request R to disengage a gear is received, the pressure waveform PW and clutch slip waveforms CSW lag, causing a delay before the clutch slip reaches a 100% slip (signifying a complete disengagement of the gear). A disengage delay DD is shown as the time between the request R and the clutch slip reaching 100%, which in the present example is approximately 4 seconds.

Figure 5:
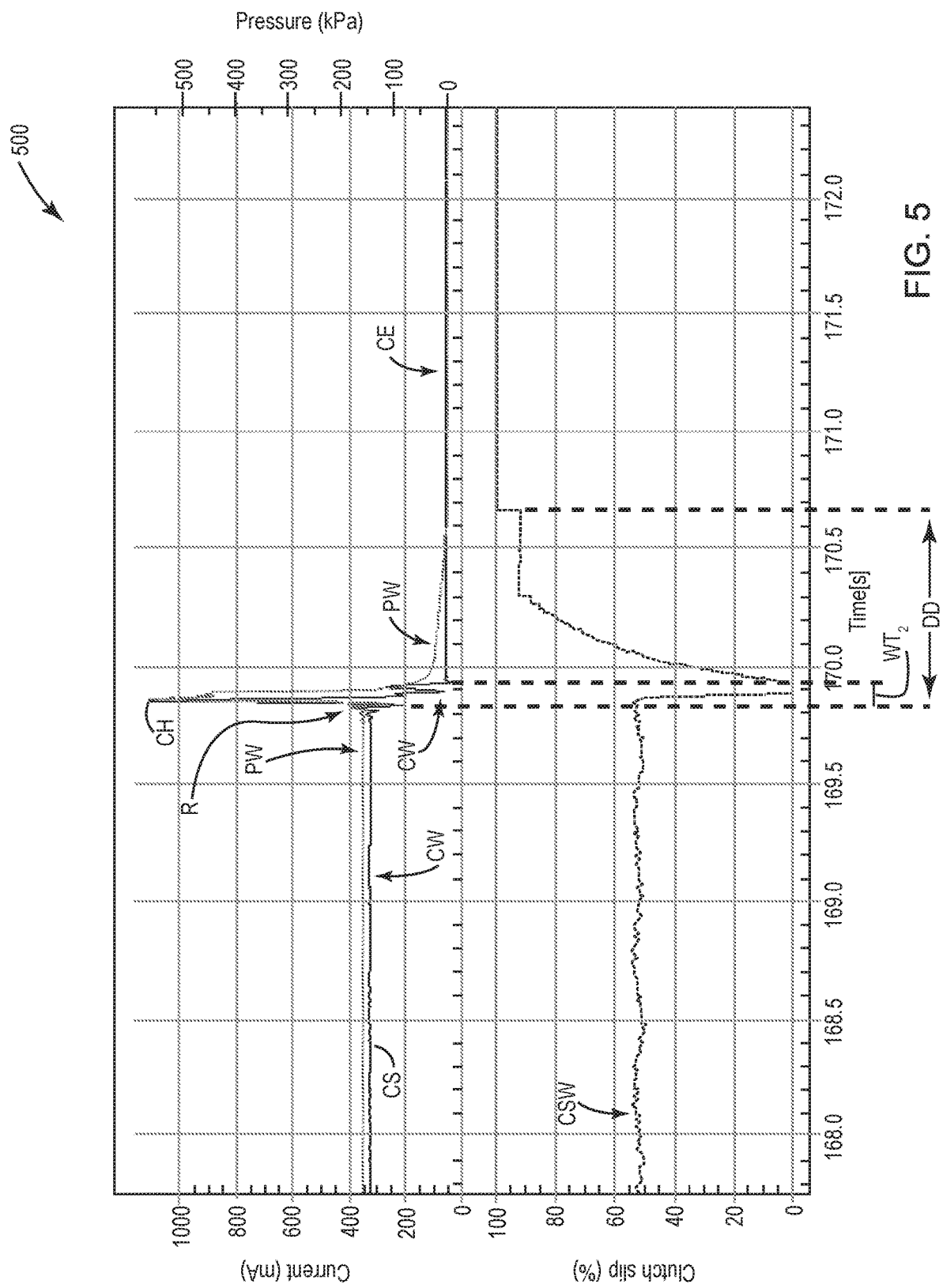
FIG. 5 is a graph depicting an alternative process for controlling a valve to overcome some of the disadvantages of controlling valves as presently known in the art.

The inventors conducted experiments to overcome the sticky valves and long disengage delays DD shown in the prior art control method of FIG. 4. When the request R to disengage a gear is received, a "flush pulse" was immediately delivered to the valve, which is a pulse of current delivered by commanding a step change in the valve current for a short duration, for example. The delay between the de-energizing the valve and delivering the flush pulse is later referred to as a first wait time WT1, which in the present example is 0 seconds. In exemplary graph 500 shown in FIG. 5, the inventors commanded a valve current of 1,450 milliamps to command a full open state of the valve for 10 milliseconds (later referred to as a second wait time WT2) before the de-energizing the valve to disengage the gear in a convention manner. This pulse consequently applied an impulse force on the valve to cause it to open, helping to unstick the valve before the current was later reduced. Additional pulses could also be included in the sequence; however, the inventors identified success in unsticking the valve with a single pulse.

The inventors identified that providing this flush pulse after the request R to change gears did result in a reduced disengaged delay DD (in this case, 0.8 seconds rather than the previous measurement of 4 seconds), the process also caused an audible clunk sound as the drive trains components rapidly accelerated to match the input speed of the engine (corresponding to a clutch slip of 0%), and the lash is taken out of the drive train splines, gears, and the like.

Alternative methods for controlling the valve to disengage a gear in a transmission were developed, particularly to eliminate the audible clunk that the inventors believed may be objectionable to some operators. In particular, the inventors have identified that the audible clunk caused by the flush pulse is eliminated (or greatly diminished) by providing a brief a wait time between initially de-energizing the valve and providing the flush pulse (referred to as a first wait time WT1). In particular, the inventors discovered that by providing this first wait time WT1, some of the pressure within the clutch is permitted to bleed off, allowing the piston to move (by away piston return springs) some distance away from the plates as the clutch slip percentage begins to trend towards zero before the pulse is delivered to the valve. This distance provides that the piston does not contact the plates during the flush pulse, thereby preventing the audible clunk.

Figure 6:
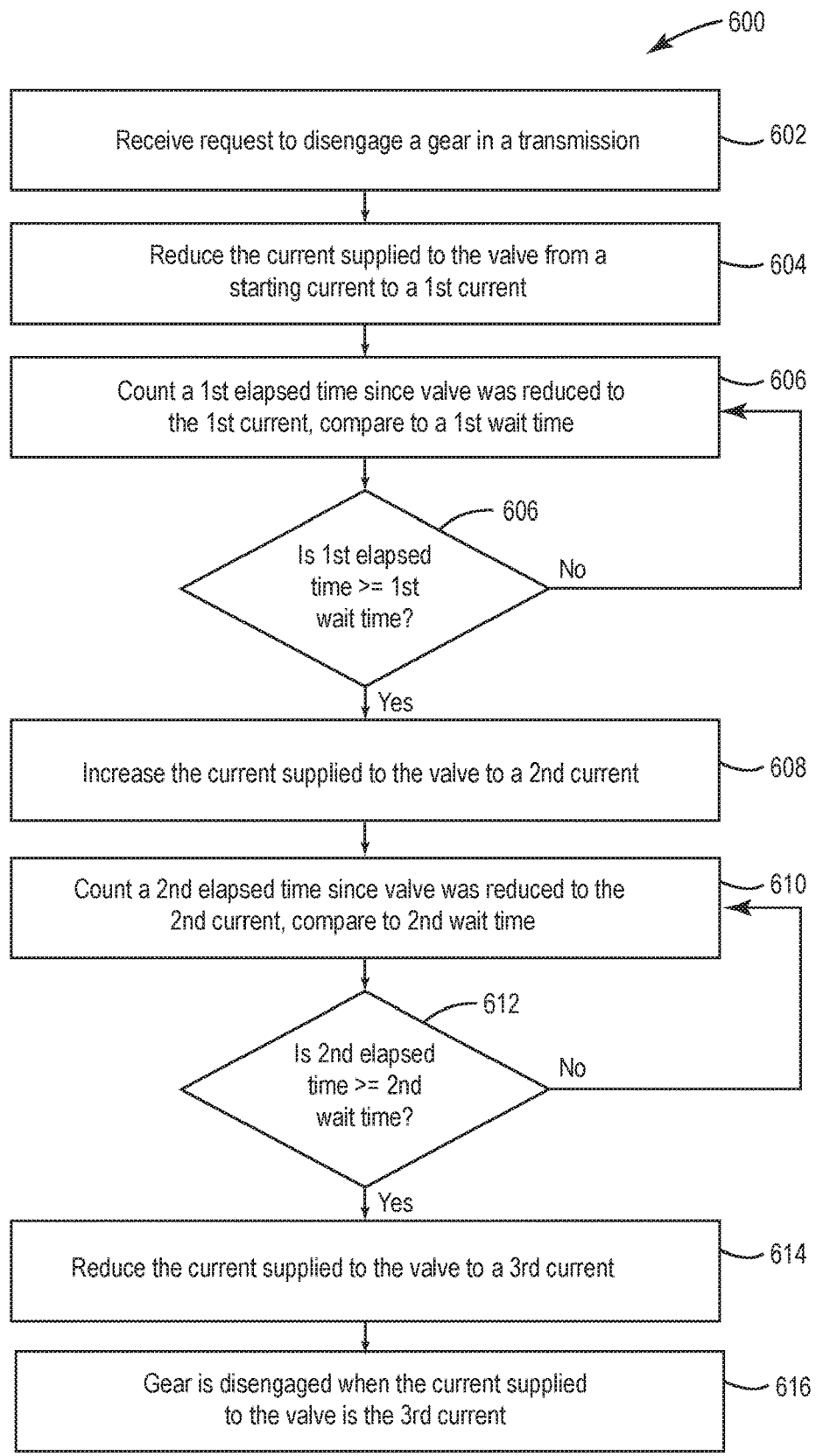
FIG. 6 is a process flow of an exemplary method for controlling valves according to the present disclosure.
Figure 7:
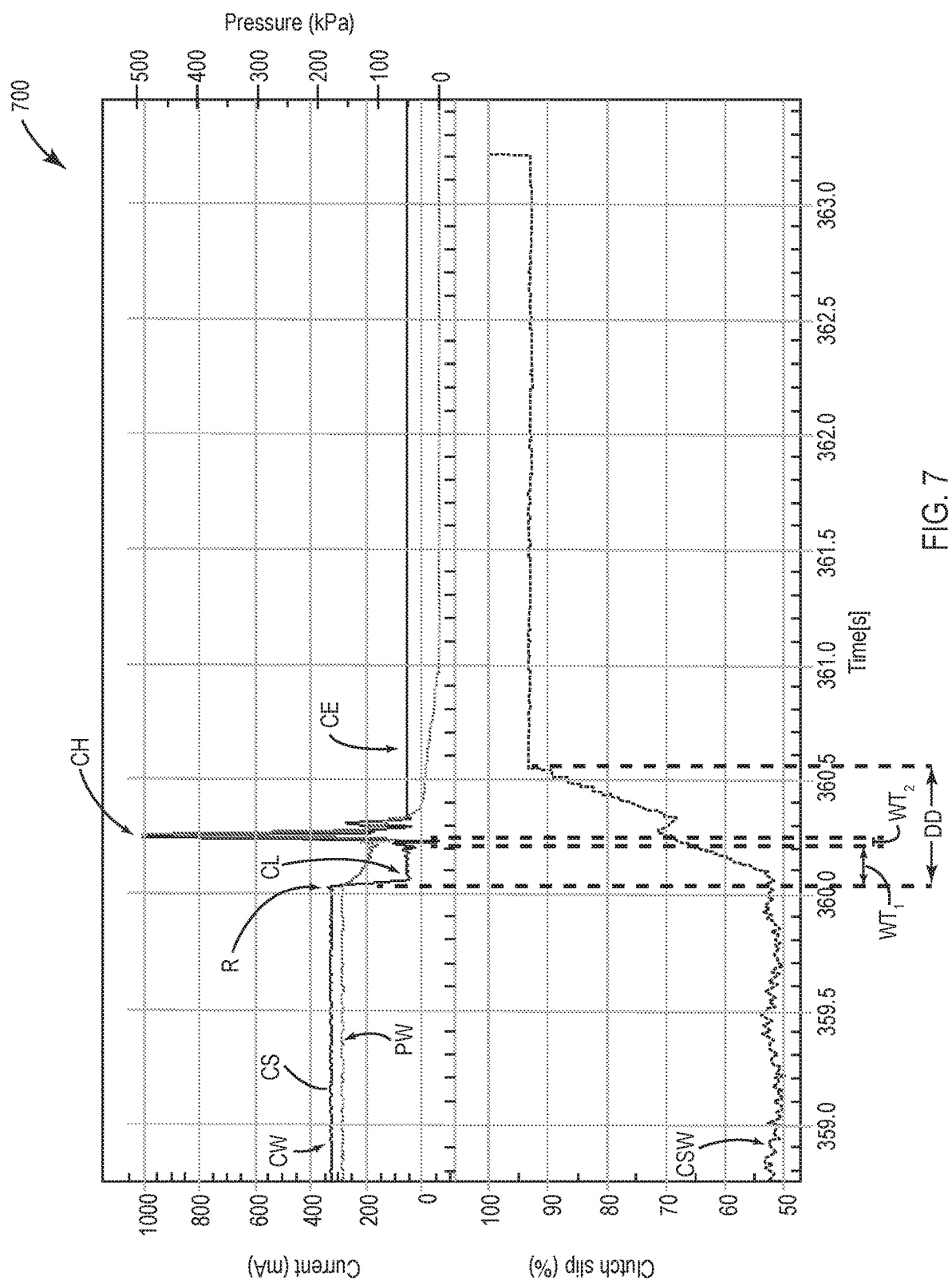
FIGS. 7-9 are graphs depicting the control and consequent performance of valves and transmissions using exemplary processes according to the present disclosure.

An exemplary process 600 and graph 700 of experimental results for operating a valve without the effects of stickiness—yet without an audible clunk—is shown in FIGS. 6 and 7. The process 600 introduces a first wait time WT1 and second wait time WT2, which is discussed further herein. In the exemplary process 600, a request R is received to disengage a gear in a transmission in step 602. In step 604, the current supplied to the valve is reduced from a starting current CS to a first current or a low current CL, as will be discussed further below. The low current CL may be the same or different from an ending current CE in which the gear is disengaged, but in either case is less than the starting current CS.

Step 606 provides for counting a first elapsed time since the current supplied to the valve was reduced to the low current CL. This first elapsed time is than compared to a first wait time WT1, which in the present example is 200 milliseconds. If it is determined in step 608 that the first elapsed time does not meet or exceed the first wait time WT1, the process 600 returns to step 606. Once the first elapsed time does meet or exceed the first wait time WT1 as determined in step 608, the process 600 continues to step 610, whereby the current supplied to the valve is increased to a second current or a high current CH. This is in effect the flush pulse previously discussed, which un-sticks the valve, but does not cause any audible clunk for the reasons provided above.

Step 612 provides for counting a second elapsed time since the valve was increased to the high current CH, which is compared to a second wait time WT2. The second wait time WT2 corresponds to the duration of the flush pulse, which in the present example is 10 milliseconds. Once the second elapsed time is determined in step 614 to meet or exceed the second wait time WT2, step 616 provides that the current supply to the valve is once again reduced, this time to a third current or ending current CE. In the example shown, the ending current CE is the same as the low current CL; however, these currents may not be the same. The process 600 concludes in steps 618, whereby the gear becomes disengaged when the current supply to the valve is at the ending current CE.

It will be recognized that the process 600 of FIG. 6 may be repeated for shifting to or from any gear in which the valve has been energized to provide pressure to the clutch corresponding thereto. Therefore, in the context of most transmissions, the process 600 would be applied anytime the user is changing gears other than from neutral.

Figure 8:
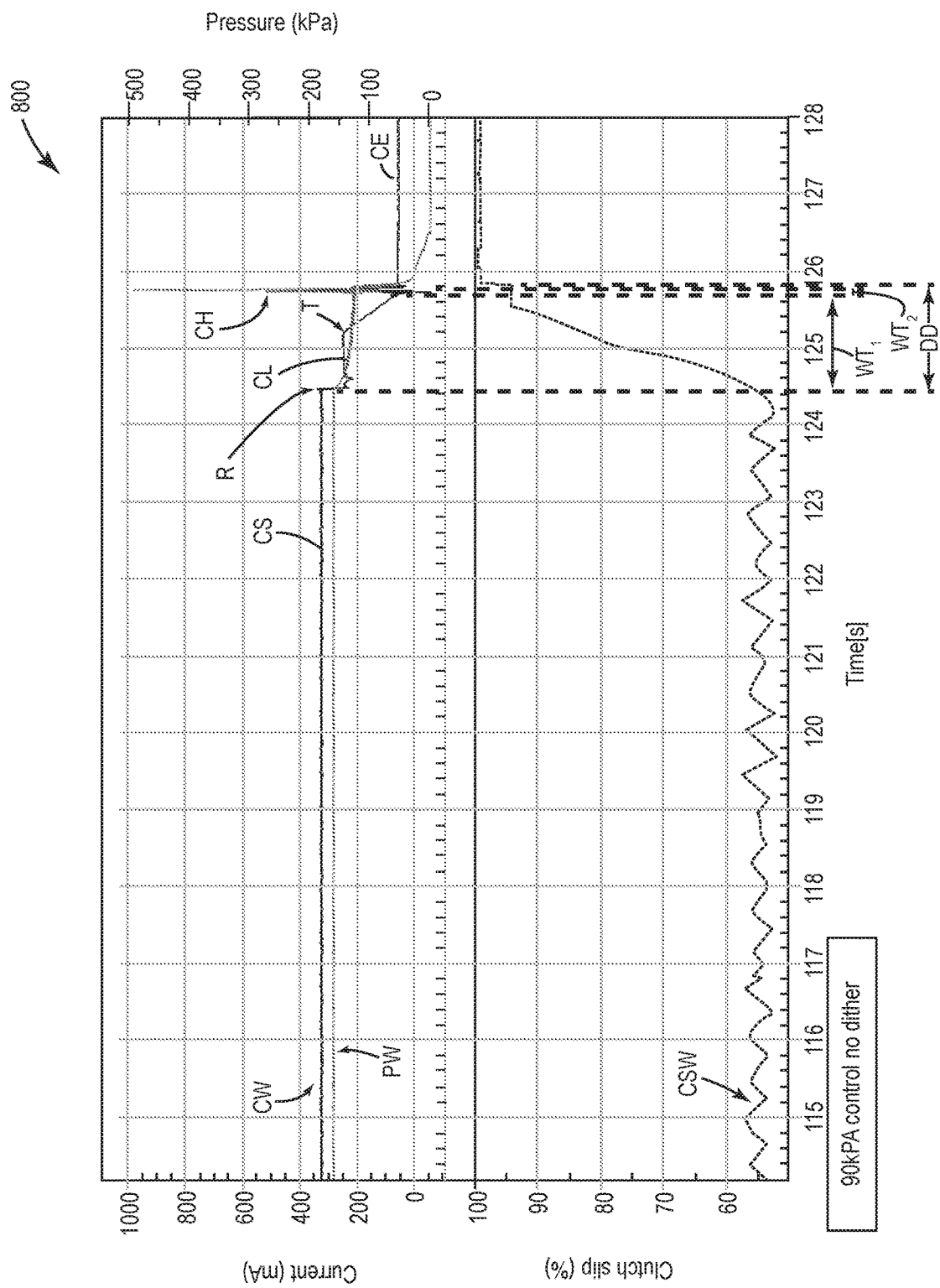

The graph 800 of FIG. 8 depicts another alternative process for controlling a valve according to the present disclosure that is similar to the process 600 of FIG. 6, but now includes a low current CL that is different (and in fact higher than) the ending current CE. In this example, the low current CL supplied to the valve after the request R to disengage a gear is reduced from the starting current CS, but is not reduced all the way down to the ending current CE. This reduction in currents nonetheless provides for a reduction in the pressure of the valve to provide the benefits described above. In particular, when the flush pulse is later provided by commanding the high current CH to the valve, no audible clunk is produced.

In the example in FIG. 8, the valve is controlled in an attempt to reach and maintain a pressure of 90 kPa after the request R is received to disengage a gear, but before the first wait time WT1 has concluded. As such the low current CL is not static, but reduces as necessary to maintain a near-constant pressure. A flush pulse of 125 kPa was then provided in the manner described above. The consequent disengage delay DD is approximately 1.4 seconds, which is less than the disengage delay DD for systems known in the art (approximately 4 seconds), but slightly greater than the disengaged delay DD of 0.5 seconds under the process 600 shown in FIG. 6 and depicted in the graph 700 of FIG. 7.

Figure 9:
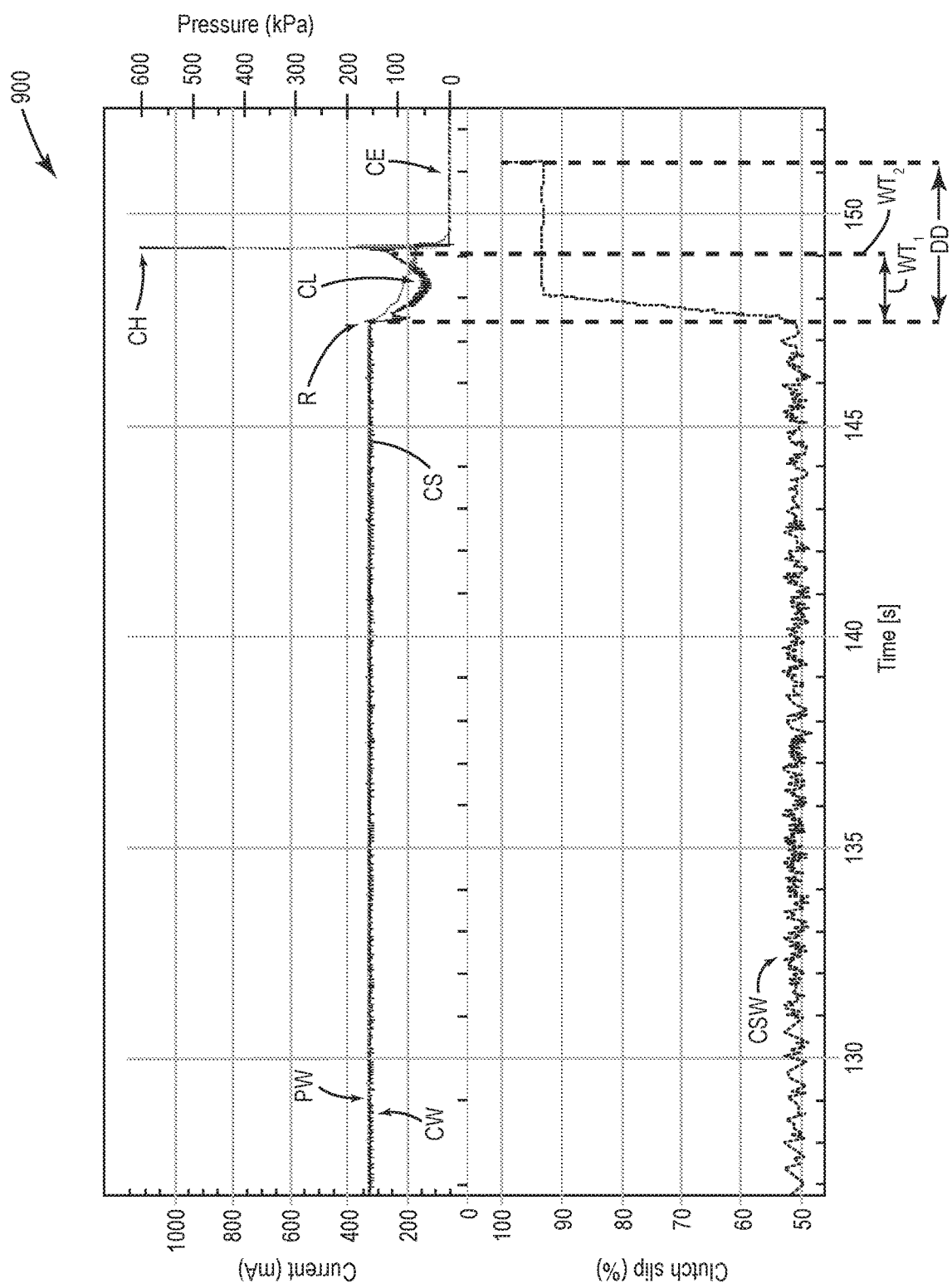

The graph 900 of FIG. 9 depicts a further embodiment similar to that of FIG. 8, but whereby a 100 milliamp dither is further provided (in addition to controlling the valve to 90 kPa pressure) between receiving the request R to disengage a gear and the flush pulse delivered after the first wait time WT1. In this example, it can be seen via the pressure waveform PW that the pressure in the valve declines towards the commanded 90 kPa much more quickly (and in fact reaches 90 kPa, unlike the process shown in FIG. 8), which is a result of the oscillation in the current supplied to the valve by a process known as "dithering." The dithering process provides for oscillating the current such that the average current remains constant, but minute changes are provided upwardly and downwardly therefrom (e.g., at magnitudes of 100 milliamp) to cause further movement of the valve. In this case, the disengaged delay DD increased to approximately 3 seconds.

The inventors have also identified further embodiments in which the pressure at the valve outlet is controlled within a closed loop control such that the pressure is below the clutch engagement pressure. If the system determines that a feedback error has occurred (i.e., the pressure at the valve outlet is not below the clutch engagement pressure), the current to the valve is pulsed to "unstick" the valve. After the pulse is completed, the valve may be controlled to close in the customary manner.

In the present description, certain terms have been used for brevity, clarity, and understanding. No unnecessary limitations are to be implied therefrom beyond the requirement of the prior art because such terms are used for descriptive purposes only and are intended to be broadly construed. The different systems and methods described herein may be used alone or in combination with other systems and methods. Various equivalents, alternatives, and modifications are possible within the scope of the appended claims.

The functional block diagrams, operational sequences, and flow diagrams provided in the Figures are representative of exemplary architectures, environments, and methodologies for performing novel aspects of the disclosure. While, for purposes of simplicity of explanation, the methodologies included herein may be in the form of a functional diagram, operational sequence, or flow diagram, and may be described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology can alternatively be represented as a series of interrelated states or events, such as in a state diagram. Moreover, not all acts illustrated in a methodology may be required for a novel implementation.

What is claimed is:

1. A method for controlling a valve to disengage a gear in a transmission for a marine propulsion device, the method comprising:
    reducing, after receiving a request to disengage the gear, a current supplied to the valve from a starting current to a first current;
    counting a first elapsed time since the valve was reduced to the first current;
    comparing the first elapsed time to a first wait time greater than zero seconds;
    increasing the current supplied to the valve to a second current once the first elapsed time is determined to exceed the first wait time;
    counting a second elapsed time since the valve was increased to the second current;
    comparing the second elapsed time to a second wait time greater than zero seconds; and
    reducing the current supplied to the valve to a third current once the second elapsed time is determined to exceed the second wait time;
    wherein the valve closes when the current supplied to the valve is the third current.

2. The method according to claim 1, wherein the first current is less than 50% of the starting current.

3. The method according to claim 1, wherein the first current is greater than zero.

4. The method according to claim 1, wherein the first wait time is between 50 and 500 ms.

5. The method according to claim 1, wherein the second current is greater than the starting current.

6. The method according to claim 1, wherein the second current is at least two times greater than the starting current.

7. The method according to claim 1, wherein the second wait time is less than the first wait time.

8. The method according to claim 1, wherein the second wait time is between 5 ms and 25 ms.

9. The method according to claim 1, wherein the third current is equal to the first current.

10. The method according to claim 1, wherein when the valve is supplied the starting current the gear is actuated such that the transmission is slipping in a trolling mode.

11. The method according to claim 1, wherein the valve operates a friction clutch to engage and disengage the gear.

12. The method according to claim 1, wherein the valve is closed within one second of receiving the request to disengage the gear.

13. A transmission for a marine propulsion device, the transmission comprising:
    a valve and a gear that is selectively engageable by the valve to generate propulsion for the marine propulsion device, wherein the engagement of the gear is controlled by controlling a current supplied to the valve;
    a memory module that stores first, second, and third currents for supplying current to the valve, and first and second wait times for controlling the current supplied to the valve, wherein the first and second wait times are non-zero;
    a processing module operatively coupled to the memory module and the valve and configured to:

receive a request to disengage the gear and to subsequently reduce the current supplied to the valve from a starting current to the first current;

count a first elapsed time since the valve was reduced to the first current;

compare the first elapsed time to the first wait time and to increase the current supplied to the valve to the second current once the first elapsed time exceeds the first wait time;

count a second elapsed time since the valve was increased to the second current;

compare the second elapsed time to the second wait time and to reduce the current supplied to the valve to the third current once the second elapsed time exceeds the second wait time;

wherein the valve is closed when the current supplied to the valve is the third current.

14. The transmission according to claim 13, wherein the first current is less than 50% of the starting current and greater than zero.

15. The transmission according to claim 13, wherein the first wait time is between 50 and 500 ms.

16. The transmission according to claim 13, wherein the second current is greater than the starting current.

17. The transmission according to claim 13, wherein the second wait time is less than the first wait time and between 5 ms and 25 ms.

18. The transmission according to claim 13, wherein the third current is equal to the first current.

19. A marine propulsion device including the transmission according to claim 13.

20. A method for controlling a valve to disengage a gear in a transmission for a marine propulsion device, the method comprising:

reducing, after receiving a request to disengage the gear, a current supplied to the valve from a starting current to a first current, wherein the first current is less than 50% of the starting current and also greater than zero;

counting a first elapsed time since the valve was reduced to the first current;

comparing the first elapsed time to a first wait time that is between 5 and 900 ms;

increasing the current supplied to the valve to a second current once the first elapsed time is determined to exceed the first wait time;

counting a second elapsed time since the valve was increased to the second current;

comparing the second elapsed time to a second wait time greater than zero seconds; and reducing the current supplied to the valve to a third current once the second elapsed time is determined to exceed the second wait time;

wherein the valve is closed when the current supplied to the valve is the third current.

\* \* \* \* \*